United States Patent [19]

Te-Chin

[11] Patent Number: 5,840,184
[45] Date of Patent: Nov. 24, 1998

[54] MAGNETIC REGULATOR FOR PREVENTING SCALE IN A NON-DRINKING WATER SYSTEM

[76] Inventor: Jan Te-Chin, 24F-1, No. 161, Sung-Teh Rd., Taipei, Taiwan

[21] Appl. No.: 938,873

[22] Filed: Sep. 26, 1997

[51] Int. Cl.⁶ .................................................. B01D 35/06
[52] U.S. Cl. ........................... 210/222; 210/232; 210/695
[58] Field of Search ..................................... 210/222, 223, 210/695, 232

[56] References Cited

U.S. PATENT DOCUMENTS 4,956,084  9/1990  Stevens ..................................... 210/222
5,500,121  3/1996  Thornton et al. ......................... 210/222

*Primary Examiner*—David A. Reifsnyder
*Attorney, Agent, or Firm*—W. Wayne Liauh

[57] ABSTRACT

A magnetic regulator for preventing water scale formation in a non-drinking water system includes a pair of semi-circular lining plates, a pair of metal plates located outside the lining plates and a plural number of magnets located outside the metal plates, and a pair of covers to house the lining plates, metal plates and magnets. The cover assembly has two circular openings at both ends to engage with a water pipe. Water flows through the regulator and is regulated by the magnetic field so that mineral compounds deposit and water scale formation in the water pipe and other downstream apparatus may be reduced or eliminated.

9 Claims, 5 Drawing Sheets

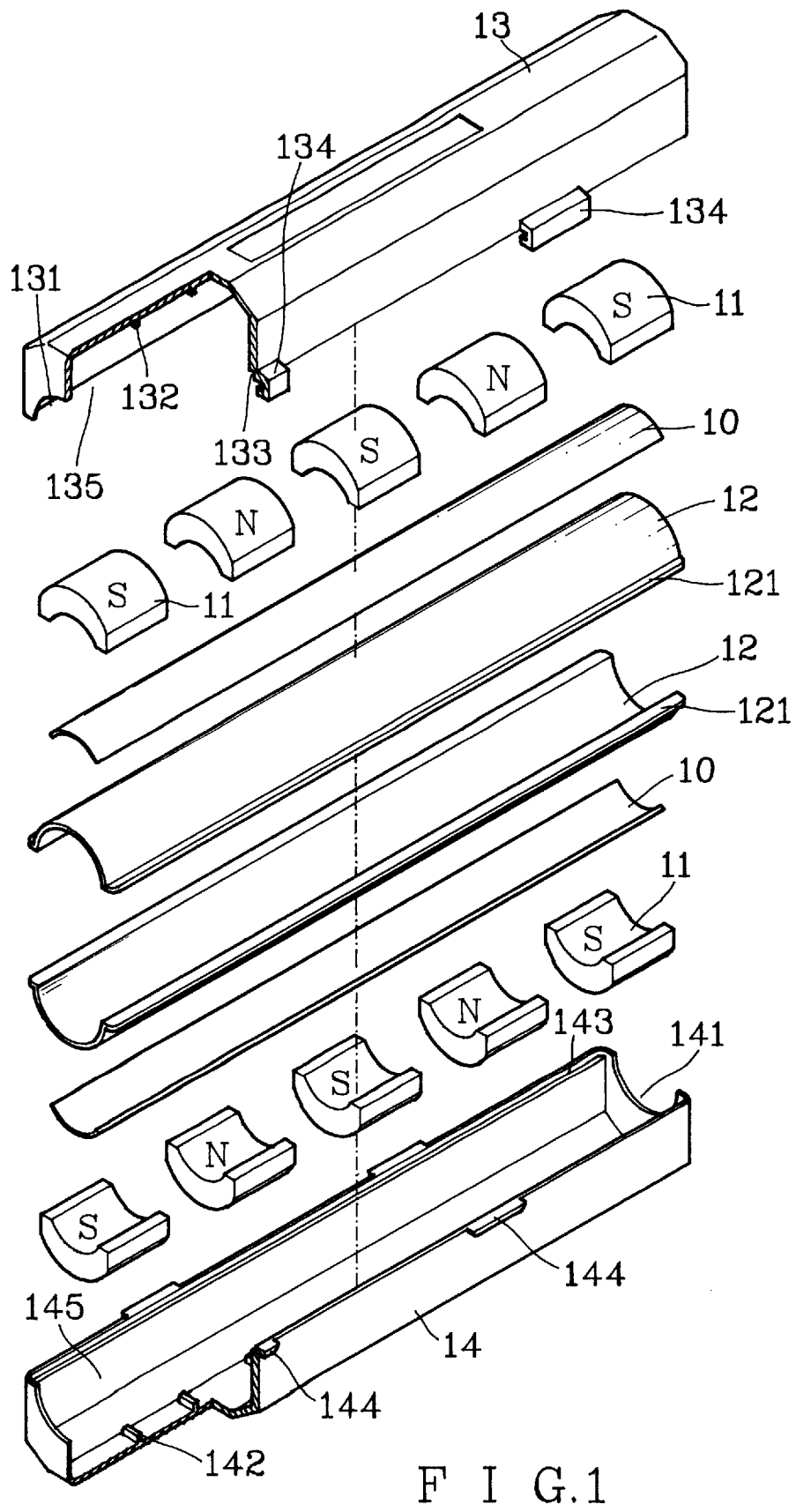
F I G. 1

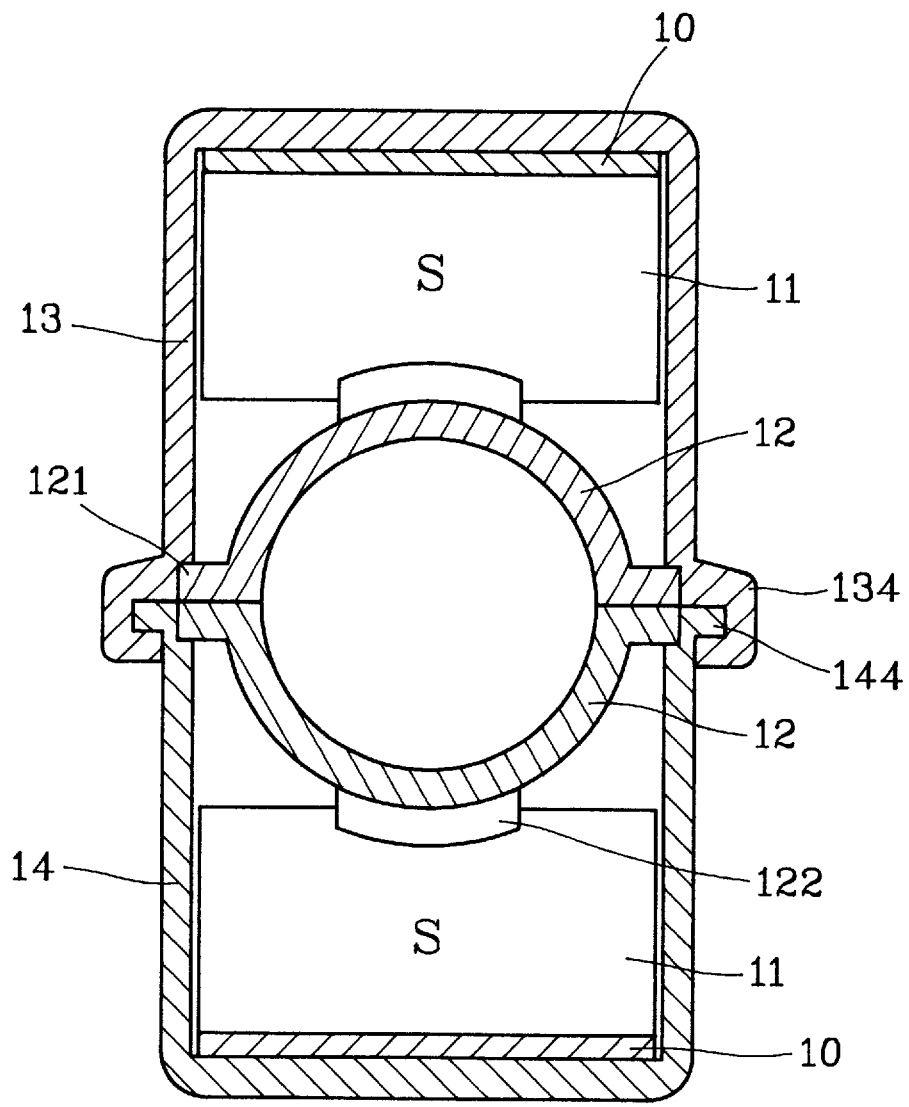
F I G.5

MAGNETIC REGULATOR FOR PREVENTING SCALE IN A NON-DRINKING WATER SYSTEM

BACKGROUND OF THE INVENTION

1. Field of the Invention

This invention relates to a magnetic regulator for preventing mineral compounds scale in a non-drinking water system and particularly to a magnetic regulator to install around a water pipe for reducing or preventing mineral compounds scale from depositing in water pipe and other downstream apparatus.

2. Description of the Prior Art

It is generally known that water soluble mineral compounds (particularly magnesium and calcium contained minerals) tend to form a metal-contained deposit called water scale or incrustation scale in water pipe, heater and boiler, especially when water is heated. This water scale has to be cleared and removed periodically manually or by chemical or other means. Otherwise the water pipe could be blocked and causes serious troubles and safety concerns. To do this job manually, water supply has to be interrupted. And it takes human being to access water heating apparatus. It is tedious, time consuming and costly. To do it by chemical means is very expensive.

There have been some prior arts trying to provide magnetic means to prevent water soluable and non-soluable mineral compounds from forming water scale deposit in the water piping and heating apparatus. They mostly use electromagnetic coils to wind around water passage (pipe) and some permanent magnets. They are complex and expensive.

SUMMARY OF THE INVENTION

In view of aforesaid disadvantages, it is an object of this invention to provide a magnetic regulator for non-drinking water system that is simple in structure, low cost to produce and easy to install and use. The magnetic regulator according to this invention includes a pair of covers to house a pair of metal plates and lining plates and a plural number of magnets. The regulator then is disposed and surrounds a section of water pipe for reducing or avoiding water scale formation.

BRIEF DESCRIPTION OF THE DRAWINGS

The invention, as well as its many advantages, may be further understood by the following detailed description and drawings in which:

FIG. 1 is an exploded view of this invention.

FIG. 5 is a cross-sectional view of another embodiment shown in FIG. 4.

DETAILED DESCRIPTION OF THE PREFERRED EMBODIMENT

Figure 2:
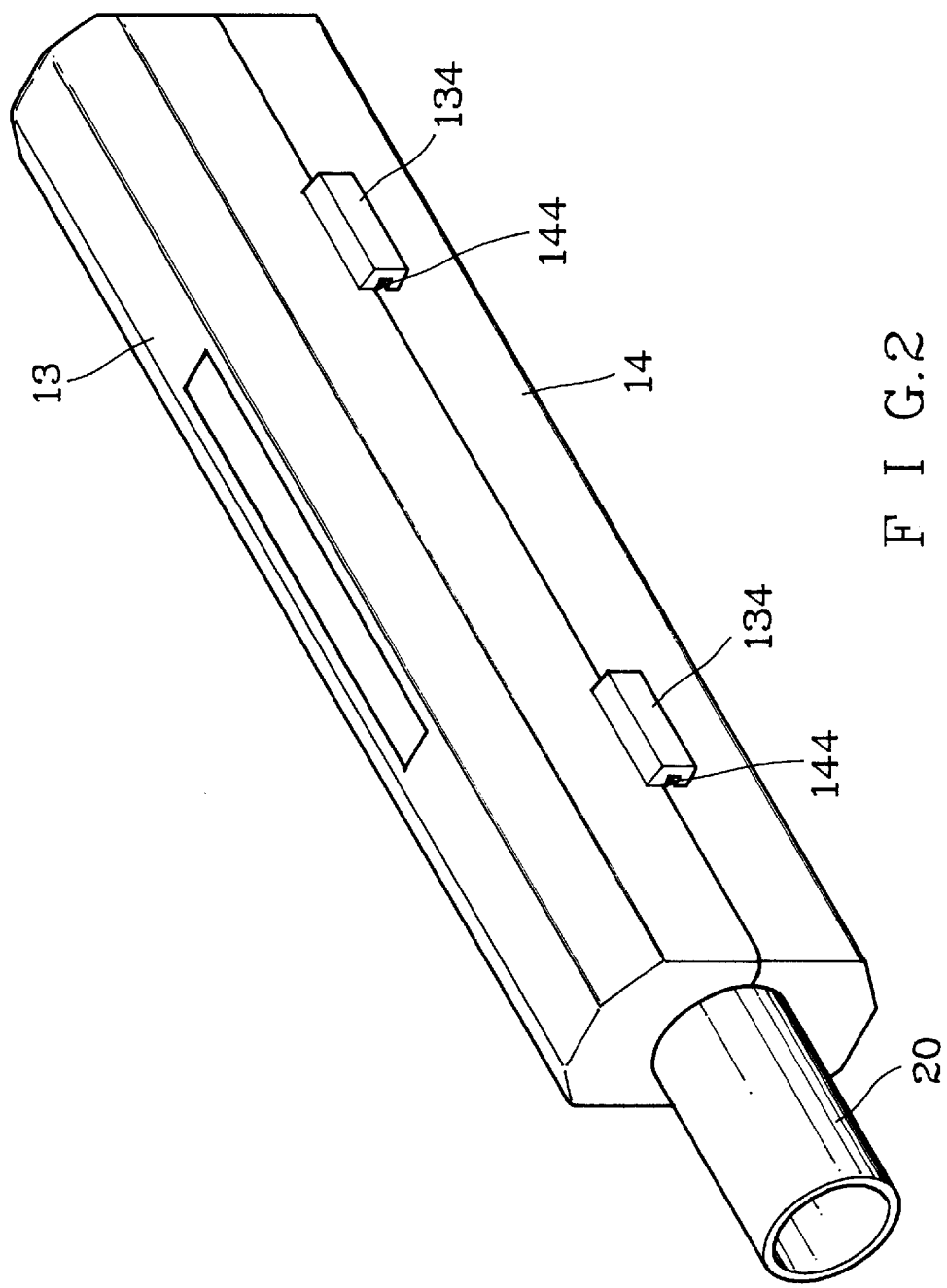
FIG. 2 is a pictorial view of this invention.
Figure 3:
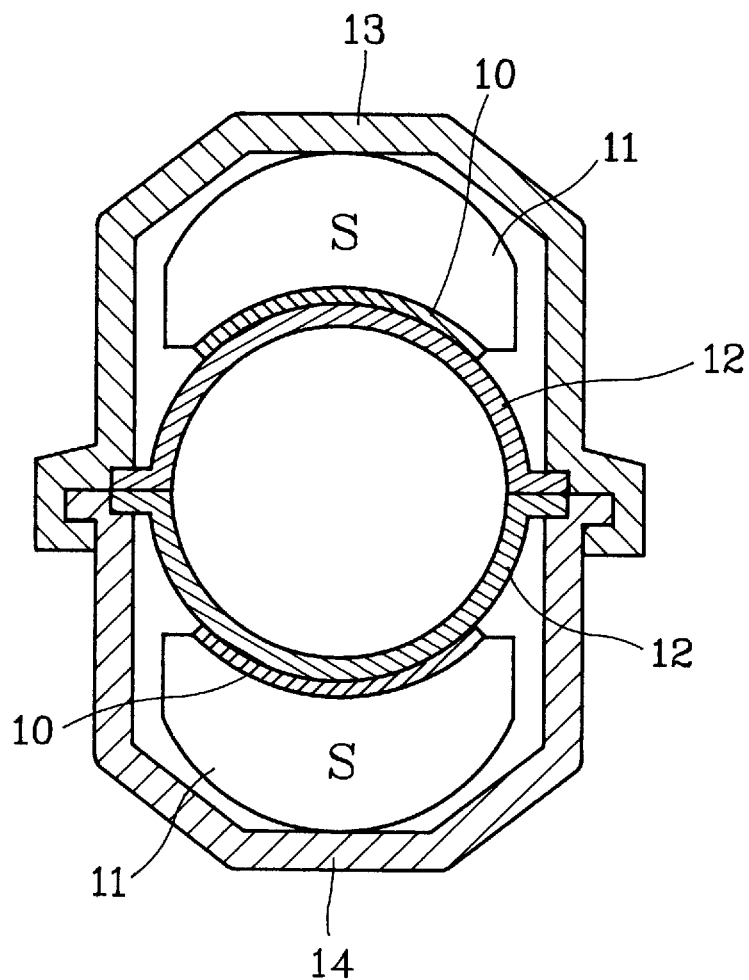
FIG. 3 is a cross-sectional view of this invention.

Referring to FIGS. 1, 2 and 3, the magnetic regulator according to this invention including pairs of metal plates 10, lining plates 12, covers 13 and 14, and a plural number of magnets 11. The metal plate 10 is made of soft magnetic materials such as soft iron and has an arched cross-section for closely mating a circular section of a lining pipe 12 from outside circumference like a sheath. The lining plate 12 is preferably made of a pair of semicircular pipes with two lateral flanges 121 engaging with each other to form a circular cross-section. Outside the metal plate 10 are a plural number of magnets 11 which are so configurated that a pair of magnets with same magnetic polarity face against each other radially across the lining plate 12, while opposite polarity adjacent each other axially and alternately. The magnets 11, metal plates 10 and lining plates 12 are then housed within a pair of covers 13 and 14 which have respectively mating snap ears 134 and 144 to engage with each other. In the internal walls of the covers 13 and 14, there are provided with spaced ridges 132 and 142 for holding the magnets 11 securely. The covers 13 and 14 have grooves 133 and 143 formed respectively in the lateral edges for holding the flanges 121 of the lining plates 12. At both ends of the covers 13 and 14, there are circular openings 131 and 141 for engaging with a water pipe 20.

For assembly of this invention, first placing the magnets 11 in the covers 13 and 14 between the ridges 132 and 142. Then put the metal plate 10 upon the magnets 11 and lining plate 12 in the covers, with the flanges 121 sitting in the grooves 133 and 143. Covers 13 and 14 then mate and engage with each other at the snap ears 134 and 144 to form a complete set of magnetic regulator. It then may be installed easily at a section of water pipe 20 desired, such as water supply for heater or boiler. Water flowing through the magnetic regulator of this invention will be regulated by the magnetic field continuously. Therefore the deposition of mineral compounds, consequently the formation of water scale, may be reduced or eliminated.

Figure 4:
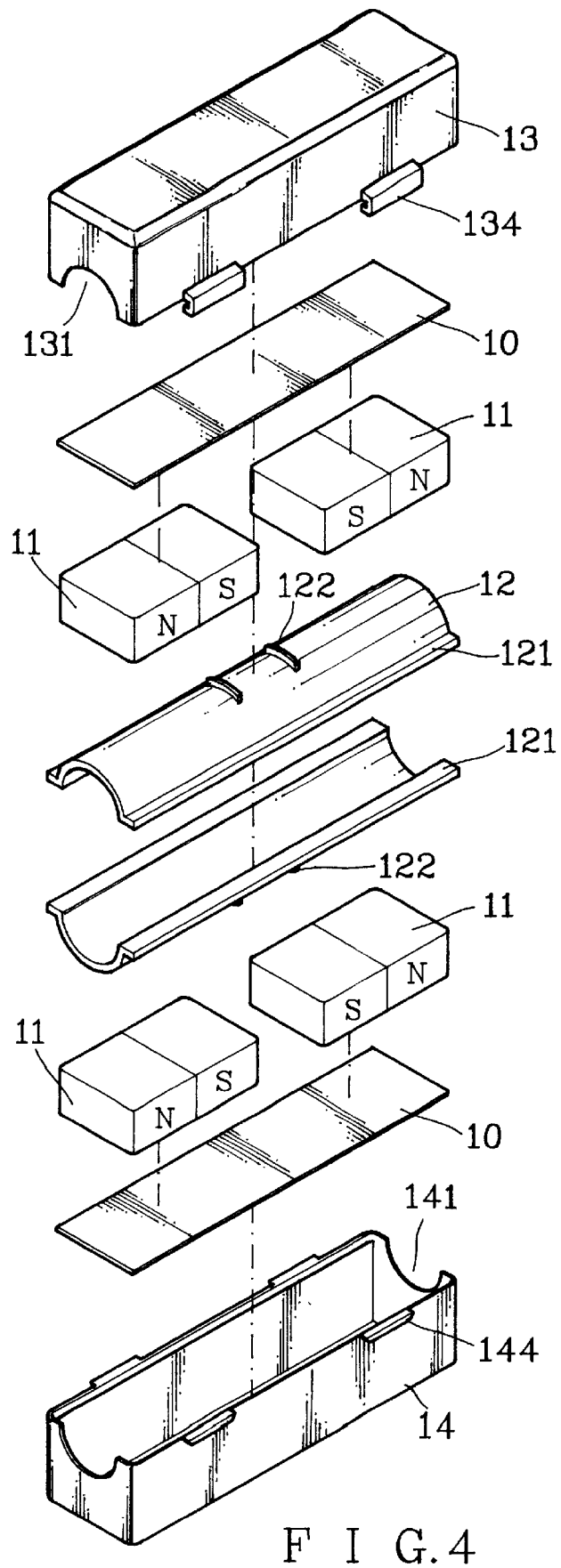
FIG. 4 is an exploded view of another embodiment of this invention.

FIGS. 4 and 5 illustrate another embodiment of this invention. Comparing with the embodiment shown in FIGS. 1 and 3, the covers 13 and 14 form substantially a rectangular cross-section when assembled together. Inside the covers 13 and 14, the metal plate 10, magnets 11 and lining plate 12 are housed in that order. The magnets 11 are rectangularly shaped, have bigger size and are axially aligned in pairs. Each pair has two opposite polarities. Two adjacent pairs of magnets have same polarity face against each other. The ridges 122 for holding the magnets are formed on the lining plate 12 rather than in the covers 13 and 14. The metal plates 10 are formed in a rectangular shape. Such a structure is even simpler to produce and has more powerful magnetic field. When in use, the magnets alignment may be made SNNS rather than NSSN as shown in FIG. 4.

It may thus be seen that the objects of the present invention set forth herein, as well as those made apparent from the foregoing description, are efficiently attained. While the preferred embodiments of the invention have been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

I claim:

1. A magnetic regulator for preventing water scale formation in a non-drinking water system, comprising:

a pair of metal plates forming a sheath;

a pair of semicircular lining plates located between the metal plates to form a substantially circular cross-section when assembled, each lining plate having two lateral flanges;

a plural number of magnets located axially outside the lining plates, including a pair of magnets having the same polarity and being located radially across from the lining plates, and a pair of magnets having opposite polarities and being located axially adjacent each other; and a pair of covers to house the metal plates, magnets and lining plates therein; each cover having a grove in each of two lateral edges for engaging with one of the two lateral flanges of each of the lining plates, pairs of snap ears on two lateral sides thereof for engaging with each other to form a complete enclosure, and a semicircular opening to form an opening when assembled for engaging with a water pipe.

2. A magnetic regulator according to claim 1, wherein the magnets are rectangular in shape.

3. A magnetic regulator according to claim 1, wherein the metal plates are rectangular in shape.

4. A magnetic regulator according to claim 1, wherein each metal plate is located between the plural number of magnets and the cover, with ridges being formed on an outside surface of the lining plate for holding the magnets.

5. A magnetic regulator according to claim 1, wherein the magnets are grouped in axial pairs, each pair has two opposite polarities, each two pairs has the same polarity facing each other.

6. A magnetic regulator according to claim 1, wherein the magnets have an arch-shaped cross-section.

7. A magnetic regulator according to claim 1, wherein the metal plates have an arch-shaped cross-section.

8. A magnetic regulator according to claim 1, wherein the magnets are located axially outside the metal plates.

9. A magnetic regulator according to claim 1, wherein there are a plural number of spaced ridges on an inside surface of the covers for holding the magnets.

* * * * *